US011438805B2

(12) United States Patent
Polehn et al.

(10) Patent No.: US 11,438,805 B2
(45) Date of Patent: Sep. 6, 2022

(54) SYSTEM AND METHOD FOR LATENCY CERTIFICATION SERVICE

(71) Applicant: Verizon Patent and Licensing Inc., Arlington, VA (US)

(72) Inventors: Donna L. Polehn, Mercer Island, WA (US); Daryl M. Low, San Jose, CA (US); Patricia R. Chang, San Ramon, CA (US); Jin Yang, Orinda, CA (US); Arda Aksu, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 301 days.

(21) Appl. No.: 16/582,320

(22) Filed: Sep. 25, 2019

(65) Prior Publication Data

US 2021/0092646 A1 Mar. 25, 2021

(51) Int. Cl.
| | |
|---|---|
| *H04L 12/00* | (2006.01) |
| *H04W 28/20* | (2009.01) |
| *H04W 80/06* | (2009.01) |
| *H04L 43/106* | (2022.01) |
| *G06F 9/455* | (2018.01) |
| *H04L 43/0852* | (2022.01) |
| *H04L 9/32* | (2006.01) |
| *H04W 12/03* | (2021.01) |
| *H04W 12/069* | (2021.01) |

(52) U.S. Cl.
CPC ........ *H04W 28/20* (2013.01); *G06F 9/45558* (2013.01); *H04L 9/3247* (2013.01); *H04L 43/0852* (2013.01); *H04L 43/106* (2013.01); *H04W 12/03* (2021.01); *H04W 12/069* (2021.01); *H04W 80/06* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 11,106,540 B1 * | 8/2021 | Weicker | G06F 11/1464 |
| 2003/0123481 A1 * | 7/2003 | Neale | H04L 12/2856 |
| | | | 370/466 |
| 2013/0058212 A1 * | 3/2013 | Noy | H04L 1/18 |
| | | | 370/230 |
| 2015/0172317 A1 * | 6/2015 | Osborne | H04L 63/20 |
| | | | 713/178 |
| 2016/0345179 A1 * | 11/2016 | Chen | H04W 12/02 |
| 2018/0176775 A1 * | 6/2018 | Obaidi | H04W 76/10 |
| 2020/0322233 A1 * | 10/2020 | Gao | H04L 41/5019 |
| 2020/0351900 A1 * | 11/2020 | Zhang | H04M 15/8044 |

\* cited by examiner

*Primary Examiner* — Noel R Beharry
*Assistant Examiner* — Lionel Preval

(57) ABSTRACT

Systems and methods provide a latency certification service. One or more network devices in an application service layer network receive a service request for a latency certification service and instantiate a Transmission Control Protocol (TCP) proxy for a data session between an application server device and a user equipment (UE) device. The one or more network devices obtain a digital certificate for the TCP proxy. The one or more network devices receive, at the TCP proxy, a data packet from the UE device; apply a certified timestamp to the data packet to form a certified timestamped data packet; and forward the certified timestamped data packet to the application server device.

20 Claims, 8 Drawing Sheets

SYSTEM AND METHOD FOR LATENCY CERTIFICATION SERVICE

BACKGROUND

New broadband cellular networks can provide various services and applications to user devices with minimal latency. For example, Fifth Generation New Radio (5G-NR) networks can use millimeter wave (mmWave) air interface technology to provide significant improvements in bandwidth and/or latency over previous wireless network technology. Furthermore, the use of Multi-access Edge Computing (MEC) platforms (also referred to as Mobile Edge Computing platforms) allows high network computing loads to be transferred onto edge servers, which can further minimize latency and reduce backhaul, depending on the location of the edge servers relative to the point of attachment (e.g., a wireless station for a user device). However, for some types of applications, consistent and/or known latency can be more important for a user experience than simply achieving a lowest possible latency.

DETAILED DESCRIPTION OF PREFERRED EMBODIMENTS

Figure 1:
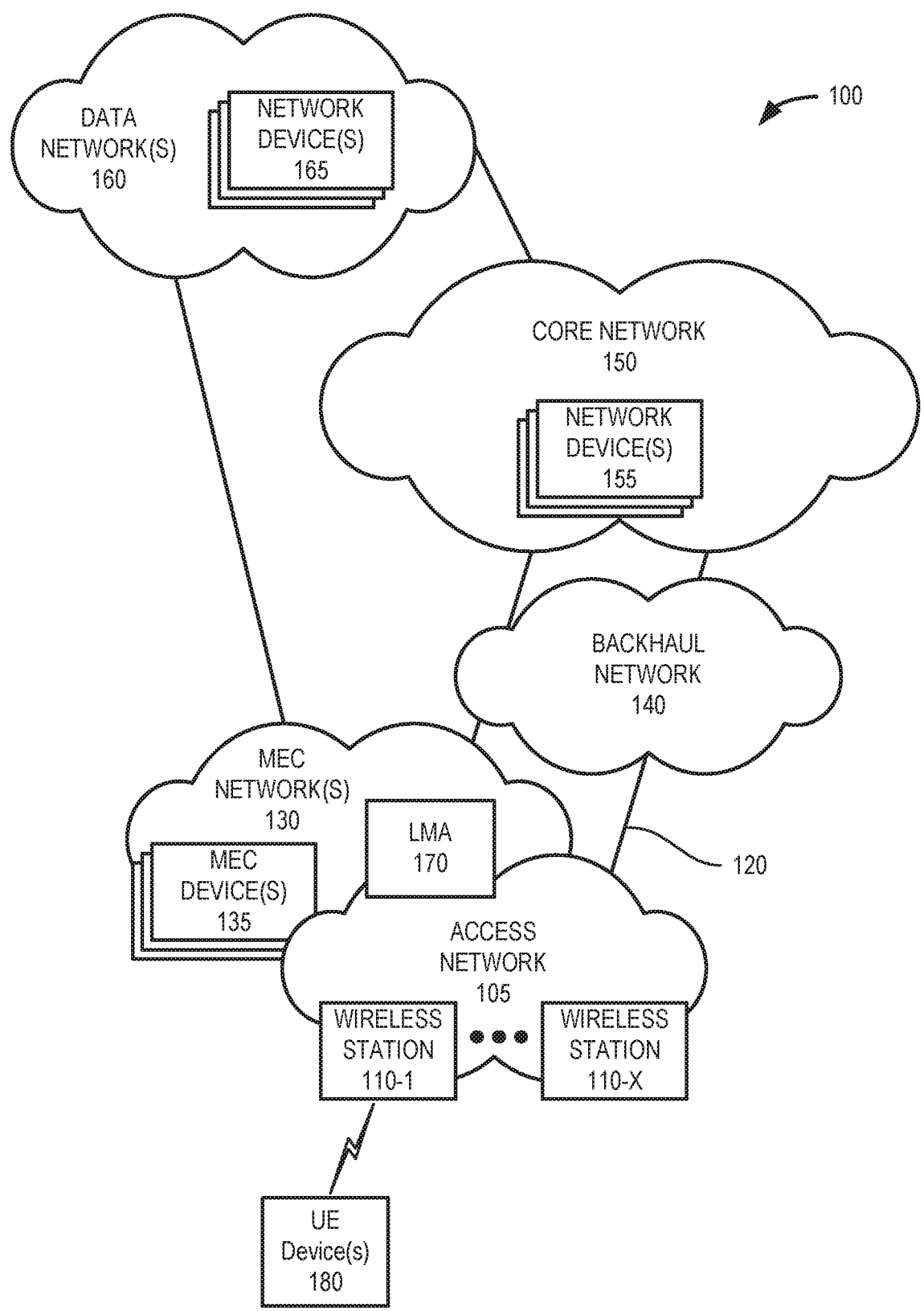
FIG. 1 is a diagram illustrating an exemplary network environment in which a latency certification service described herein may be implemented.

The following detailed description refers to the accompanying drawings. The same reference numbers in different drawings may identify the same or similar elements. Also, the following detailed description does not limit the invention.

Timing of network communications in certain types of applications can affect the user experience or the integrity of a service. In some instances, customers (e.g., application providers) may benefit more from knowing the precise latency of a communication, rather than simply achieving the lowest possible latency. For example, latency differences for different users can have an adverse impact for gaming applications, where competing users may receive signals at slightly different times. As another example, different latencies among users of an on-line trading application (e.g., commodities, crypto currency, etc.) or an on-line auction may cause the order of submissions or transactions to be documented inaccurately. Consistent latency may also prove beneficial in other network applications involving multiple participants, such as remote surgery or telemetry.

Given accurate timing/latency information for a packet flow, network devices may adjust packet delivery rates to ensure consistent latency. For example, for certain types of applications, it may be beneficial to have some network devices briefly hold packets to add latency and ensure that all packets are delivered with the same latency. Additionally, providers of time-sensitive application services may rely on accurate timing information to ensure fair and reliable user experiences. While timing sources can be provided at end devices (e.g., user equipment (UE)), such end devices may be subject to tampering. Thus, there is a need for a network-based solution that provides accurate tamper-proof timing information for packet flows.

Systems and methods described herein provide a latency certification service. According to implementations described herein, a latency monitoring agent is installed at a network edge. The latency monitoring agent tracks the latency of a particular data flow from a UE device to a network edge device. In one implementation, the latency monitoring agent includes a dedicated Transmission Control Protocol (TCP) proxy for each data session, each of which may be instantiated on a virtual machine. When the user device initiates a session with an application server for a time-sensitive service, the application server may re-direct the session to the TCP proxy. The TCP proxy may add to each packet of the flow a certified timestamp that is accurate, for example, within several nanoseconds.

The timestamp may mark the receipt time of the packet at the network edge. An estimate of air travel time of the packet, from the UE device to a network device in the radio access network, may also be provided to more precisely indicate, for example, the time of user input at the UE device. Certified timestamps may be assigned to packets at the network level, preventing spoofing of packet origination or delivery times.

FIG. 1 illustrates an exemplary environment 100 in which an embodiment of the latency certification service may be implemented. As illustrated, environment 100 includes an access network 105, one or more MEC networks 130, a backhaul network 140, a core network 150, and one or more data networks 160. Access network 105 may include wireless stations 110-1 through 110-X (referred to collectively as wireless stations 110 and generally as wireless station 110). MEC network 130 may include MEC devices 135; core network 150 may include network devices 155; and data networks 160 may include network devices 165. Environment 100 further includes a latency monitoring agent (LMA) 170 and one or more UE devices 180.

The number, the type, and the arrangement of network devices and the number of UE devices 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between UE devices 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fifth Generation (5G) radio access network (RAN), Fourth Generation (4G) RAN, and/or another type of future generation RAN. By way of further example, access network 105 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 105 may be implemented according to various wireless technologies (e.g., radio access technology (RAT), etc.), wireless standards, wireless frequencies/bands, and so forth. According to an implementation, wireless stations 110 may include a gNB with multiple distributed components, such as a central unit (CU), a distributed unit (DU), a remote unit (RU or a remote radio unit (RRU)), or another type of distributed arrangement.

MEC network 130 includes a platform that provides application services at the edge of a network, such as the latency certification service. For purposes of illustration and description, MEC devices 135 may include various types of network devices that may be resident in MEC network 130. MEC devices 135 may be located to provide geographic proximity to various groups of wireless stations 110. In some embodiments, MEC devices 135 may be co-located with wireless stations 110. In other embodiments, wireless stations 110 may connect to MEC network 130 via wired (e.g., optical) backhaul links 120.

MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

Backhaul network 140 may include one or multiple networks of one or multiple types and technologies. According to an exemplary implementation, backhaul network 140 includes a backbone network. For example, the backbone network may be implemented as an optical transport network, an ultra-high capacity wireless backhaul network, an Ethernet backhaul network, a dark fiber network, or another suitable architecture (e.g., Internet Protocol (IP)/Multiprotocol Label Switching (MPLS), millimeter wave technology, etc.). Depending on the implementation, backhaul network 140 may include switches, routers, repeaters, various types of optical network elements (e.g., multiplexers, de-multiplexers, switches, transmitters, receivers, etc.), and/or other types of network devices.

Core network 150 may include one or multiple networks of one or multiple network types and technologies. For example, core network 150 may be implemented to include a next generation core (NGC) network for a 5G network, an Evolved Packet Core (EPC) of an LTE network, an LTE-A network, an LTE-A Pro network, and/or a legacy core network. Depending on the implementation, core network 150 may include various network components and devices 155, such as for example, a user plane function (UPF), an access and mobility management function (AMF), a session management function (SMF), a unified data management (UDM) device or function, an authentication server function (AUSF), a network slice selection function (NSSF), and so forth. For purposes of illustration and description, network devices 155 may include various types of network devices that may be resident in core network 150. Core network 150 may manage communication sessions for UE devices 180. For example, core network 130 may establish an Internet Protocol (IP) connection between UE device 180 and a particular data network 160. Furthermore, core network 150 may enable UE device 180 to communicate with an application server or another type of network device 165 located in a particular data network 160 using a communication method that does not require the establishment of an IP connection between UE device 180 and data network 160, such as, for example, Data over Non-Access Stratum (DoNAS).

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices 165 that provide various applications, services, or other type of user device assets (e.g., servers (e.g., web, application, cloud, etc.), mass storage devices, data center devices), and/or other types of network services pertaining to various network-related functions. According to one implementation, network devices 165 may include a time-sensitive application server that relies on the latency certification service, as described further herein. According to another implementation, network devices 165 may include a certificate authority (CA) that supports the latency certification service.

Latency monitoring agent (LMA) 170 may include one or more network devices configured to implement the latency certification service. According to an implementation, latency monitoring agent 170 may receive requests from applications to utilize the latency certification service. Latency monitoring agent 170 may be included at a network edge, such as within access network 105 or MEC network 130. As used herein, the network including latency monitoring agent 170 (e.g., within MEC network 130 or a portion of access network 105) may generally be referred to as an "application service layer network." According to another implementation, latency monitoring agent 170 may select an edge resource, from the multiple MEC networks 130 and or wireless stations 110, to provide requested latency certification services and may instruct the edge resource to perform container provisioning and service provisioning for the latency certification service. Latency monitoring agent 170 is described further in connection with, for example, FIG. 2.

UE devices 180 may each include a mobile device, such as wireless or cellular telephone device (e.g., a conventional cell phone with data processing capabilities), a smart phone, a personal digital assistant (PDA) that can include a radiotelephone, etc. In another implementation, UE device 180 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UE devices 180 may be implemented as a machine-type communications (MTC) device, an Internet of Things (IoT) device, a machine-to-machine (M2M) device, etc., that includes communication functionality, such as a home appliance device, a home monitoring device, a camera, etc. UE devices 180 may connect to wireless stations 110 in a wireless manner. UE device 180 and the person associated with UE device 180 (e.g., the party holding or using UE device 180) may be referred to collectively as UE device 180 in the description below.

Figure 2:
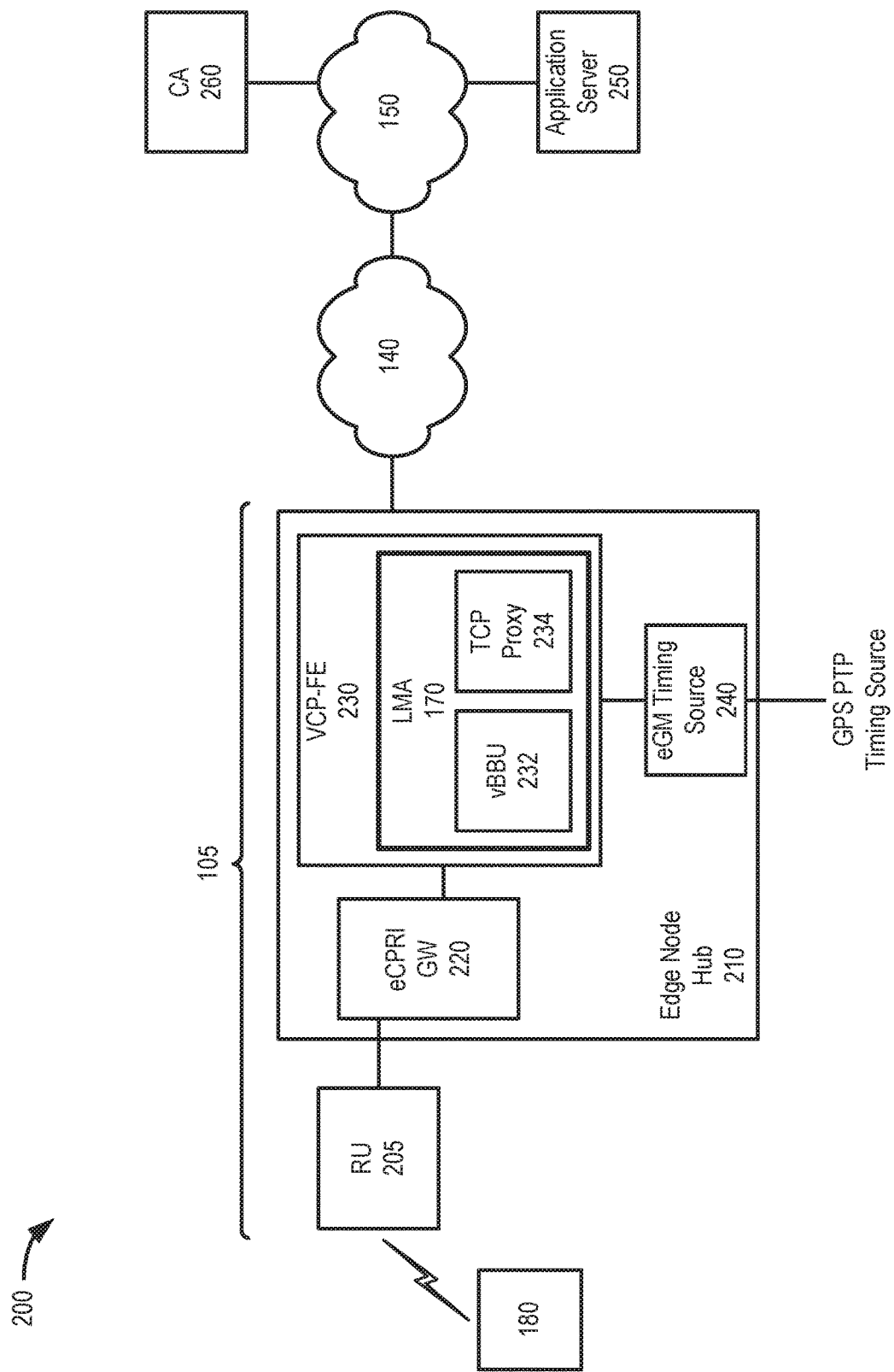
FIG. 2 is a block diagram illustrating an exemplary implementation of the latency monitoring agent of FIG. 1 in a portion of the network environment of FIG. 1.

FIG. 2 is a block diagram illustrating an exemplary implementation of latency monitoring agent 170 in a portion 200 of network environment 100. As shown in FIG. 2, network portion 200 may include access network 105, backhaul network 140, core network 150, and UE device 180. Access network 105 may include a remote unit (RU) 205 and an edge node hub 210. Network portion 200 may also include an application server 250 and a certificate authority 260, each of which may correspond to one of network devices 165.

Remote unit 205 (also referred to as a remote radio head (RRH)) may provide radio frequency (RF) functionality to establish wireless channels 215 with UE devices 180. Remote unit 205 may be embodied in different form factors having different sizes and various capabilities.

Edge node hub 210 may provide routing, load balancing, and digital base band functionality for communications between UE devices 180 and core network 150. In one implementation, edge node hub 210 may be physically displaced from remote unit 205, and may consolidate processing resources that may be shared among multiple remote units 205. As shown in FIG. 2, edge node hub 210 may include an enhanced common public radio interface (eCPRI) gateway (GW) 220, a virtualized controller platform-far edge (VCP-FE) 230, and an edge grand master (eGM) timing source 240.

The eCPRI GW 220 may provide an interface for transporting radio data over Ethernet and vice versa. Radio data received from RU 205 may be forwarded by eCPRI GW 220 to VCP-FE 230. Conversely, Ethernet data received from VCP-FE 230 may be forwarded by eCPRI GW 220 to RU 205.

VCP-FE 230 may include one or more processors, computer devices, etc., that control forwarding packets via access network 105 to backhaul network 140. For example, VCP-FE 230 may be configured to support network slices configured with different characteristics to support different types of applications and/or services, such as video streaming, massive Internet-of-Things (IoT) traffic, autonomous driving, etc. VCP-FE 230 may be configured to assign and/or manage network slices that are structured for the type of network traffic initiated by UE devices 180 (e.g., with particular characteristics for latency, bandwidth, jitter, etc.). VCP-FE 230 may also apply admission controls to direct wireless stations 110 and/or network devices in backhaul network 140 to admit, block, delay or redirect a request from UE device 180 depending on slice congestion levels and other factors.

Generally, VCP-FE 230 can provide a localized computing resource that can be used for specialized applications. According to an implementation, VCP-FE 230 may include virtualized components for latency monitoring agent 170, including a vBBU 232 and a TCP proxy 234. According to an implementation described herein, VCP-FE 230 may instantiate one or more virtual machines (VMs) running a vBBU 232 and/or a TCP proxy 234 in response to a request for the latency certification service.

Among other functions, vBBU 232 may track latency over an air interface between UE device 180 and remote unit 205. According to an implementation, vBBU 232 may track packets up to the available accuracy defined by the limits of the edge grand master timing source 240.

TCP proxy 234 may include a specialized, virtualized HTTPS/TCP proxy server for the latency certification service. TCP proxy 234 may act as an intermediary between, for example, UE device 180 and application server 250. UE device 180 may establish a connection to TCP proxy 234, which then establishes a connection to application server 250. Generally, TCP proxy 234 may send packets received from UE device 180 to application server 250 and may also forward packets received from application server 250 to UE device 180. As described further herein, TCP proxy 234 may apply certified timestamps to packets directed to application server 250 by UE device 180. In another implementation, TCP proxy 234 may apply certified timestamps to packets directed to UE device 180 from application server 250. TCP proxy 234 may be instantiated for a particular service request (e.g., from application server 250) to provide the latency certification service for a session between a UE device 180 and application server 250.

Edge grand master timing source 240 may include a network master clock that implements precision time protocol (PTP) or another timing protocol that provides reliable accuracy to nanosecond (ns) levels. Edge grand master timing source 240 may send timing synchronization data to client clocks in latency monitoring agent 170, for example. According to different implementations, edge grand master timing source 240 may include an IEEE 1588-2008 Class-C timing device accurate to 10 ns or a Class-A timing device accurate to within 100 ns. Edge grand master timing source 240 may obtain timing signals from Global Positioning System (GPS) satellites that include, for example, stabilized stratum 0 atomic clock hardware. According to implementations described herein, TCP proxy 234 may obtain a timestamp from eGM timing source 240 via a hardware interface (e.g., an optical 100 Gigabit Ethernet interface).

Application server 250 may include one or more network devices or computing devices for hosting programs, databases, and/or applications. Application server 250 may communicate with UE devices 180 via core network 150 and/or MEC networks 130. In one example implementation, application server 250 may provide applications, data, and/or time-sensitive services to UE device 180. For example, a time-sensitive service may require a particular QoS with a particular timing component (e.g., for latency between packets in a particular flow). In one example, application server 250 may be a web server that hosts a website from which UE device 180 can receive applications, data, and/or services. In another example, application server 250 may be a content delivery server that provides broadcast video streams, Video on Demand (VoD) content, or other multimedia content. According to an implementation, when UE device 180 accesses a time-sensitive service (e.g., from application server 250), application server 250 may re-direct a packet flow from UE device 180 to TCP proxy 234. The vBBU 232 may track the UE-to-vBBU latency to accuracy within the limits of edge grand master timing source 240.

Certificate authority 260 may include one or more network devices that act as a node in a Public Key Infrastructure (PKI) system for generating and issuing a digital identity certificate requested by a TCP proxy 234. According to an implementation, TCP proxy 234 may obtain a valid certificate from certificate authority 260 (e.g., VERISIGN, ENTRUST, or a similar certificate service) as a one-time transaction when TCP proxy 234 is instantiated.

Although FIG. 2 shows an exemplary arrangement of networks and devices for implementing the latency certification service, in other embodiments, fewer, additional, different, or a different arrangement of networks and devices may be used. For example, according to another embodiment, one or more components of edge node hub 210 may be implemented within MEC network 130.

Figure 3:
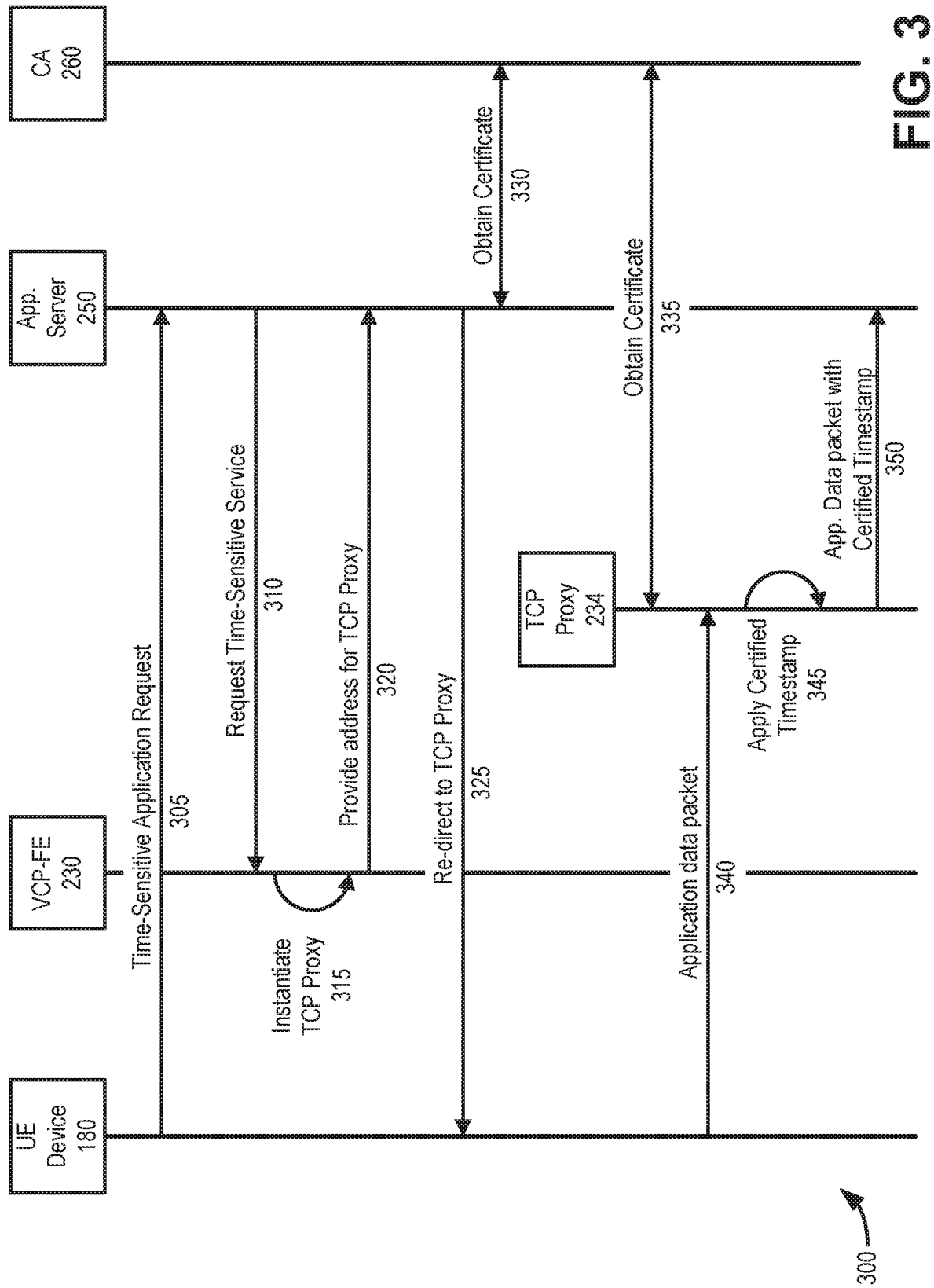
FIG. 3 is a signal flow diagram illustrating exemplary communications to provide the latency certification service in another portion of network environment of FIG. 1.

FIG. 3 is a signal flow diagram illustrating exemplary communications to provide the latency certification service in a portion 300 of network environment 100. As shown in FIG. 3, network portion 300 may include UE device 180, VCP-FE 230, and application server 250. Communications in FIG. 3 provide simplified illustrations of communications in network portion 300 and are not intended to reflect every signal or communication exchanged between devices/functions.

As shown in FIG. 3, UE device 180 may initiate a time-sensitive application request 305. For example, a user may launch, on UE device 180, an application supported by application server 250. The application may include, for example, an auction application, a gaming application, a trading application, etc. Application server 250 may receive the time-sensitive application request 305 and submit a request for time-sensitive service 310 to VCP-FE 230.

In response to the request for time-sensitive service 310, VCP-FE 230 may instantiate 315 a TCP proxy. For example, VCP-FE 230 may instantiate a virtual machine instance of TCP proxy 234 to support a data session between UE device 180 and application server 250. VCP-FE 230 may provide access information 320 (e.g., a network address, a URL, or another indicator) for the newly instantiated TCP proxy to application server 250. Application server 250 may receive the access information and use the access information to redirect 325 UE device 180 to TCP proxy 234 (e.g., for the duration of the data session).

As further shown in FIG. 3, both application server 250 and TCP proxy 234 may obtain a digital certificate from certificate authority 260. Application server 250 may obtain the certificate using, for example, a TCP and transport layer security (TLS) exchange, as indicated by reference 330. Similarly, TCP proxy 234 may obtain the certificate using, for example, another TCP and TLS exchange, as indicated by reference 335.

At some point after TCP proxy 234 and application server 250 are configured with a valid digital certificate, UE device 180 may submit an application data packet 340 via TCP proxy 234 for the time-sensitive application. TCP proxy 234 may receive the application data packet and apply to the packet a certified timestamp 345 (e.g., to nanosecond level precision). For example, TCP proxy 234 may obtain timing information for each packet from vBBU 232 and/or eGM timing source 240 and apply a corresponding timestamp to the packet. According to an implementation, TCP proxy 234 may add a signature that is derived cryptographically from the certificate obtained from certificate authority 260. The signature and timestamp may be added to the packet to form a certified timestamp. The certified timestamp may be, for example, applied as a "shim" header, included in an additional header that is wrapped around the TCP header, or conveyed in the TCP options field of the packet. TCP proxy 234 may forward the timestamped packet 350 to application server 250. The time-sensitive application service provider (e.g., application server 250) may receive timestamped packet 350 and may use a private key to decode the signature and validate the certificate for the packet.

Figure 4A:
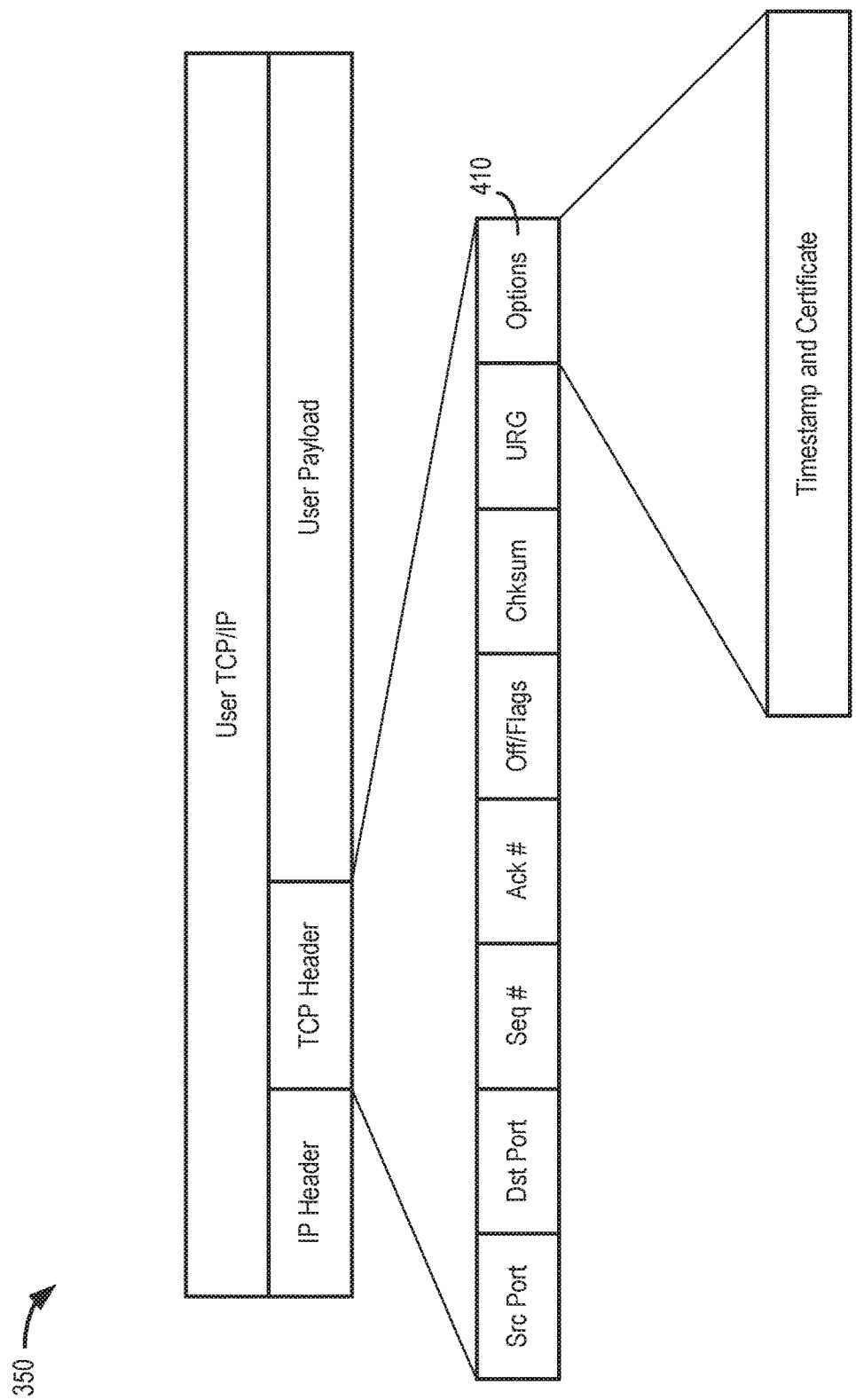
FIGS. 4A and 4B are diagrams illustrating a timestamped packet using a Transmission Control Protocol (TCP) options field for the latency certification service, according to exemplary implementation.
Figure 4B:
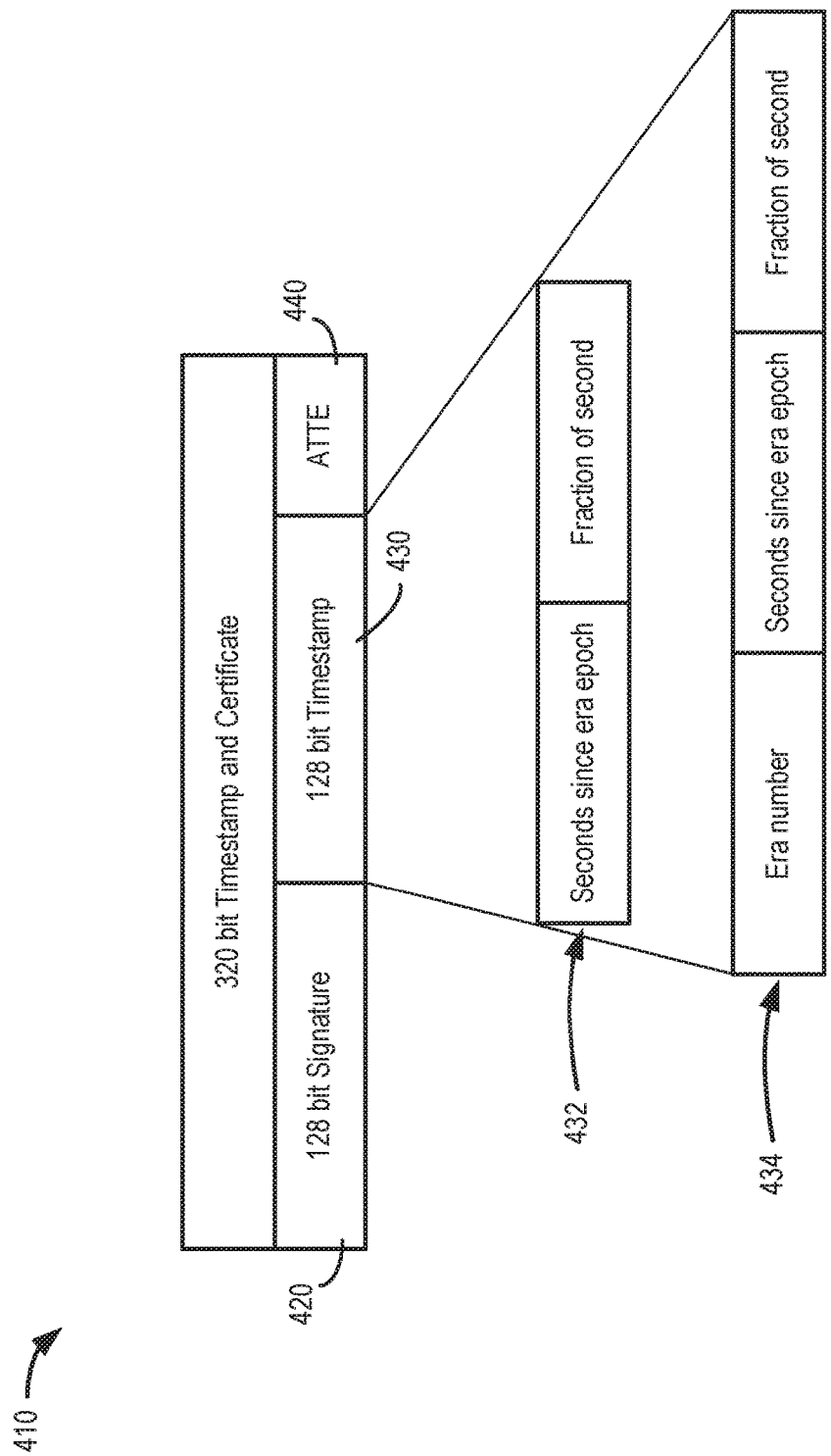

FIGS. 4A-4B are simplified illustrations of a timestamped packet 350 for the latency certification service using a TCP options field, according to exemplary implementation. As shown in FIG. 4A, timestamped packet 350 may include an options field 410 within a TCP header. Options field 410 may be configured to include a timestamp and digital certificate for timestamped packet 350. In some implementations, options field 410 may also include an air transit time estimate between UE device 180 and a network device in access network 105.

Referring to FIG. 4B, options field 410 may include a 320-bit header segment, for example, with a signature field 420, a timestamp field 430, and an air transit time estimate (ATTE) field 440. Signature field 420 may include, for example, a 128-bit signature derived cryptographically from the certificate obtained from certificate authority 260. More particularly, TCP proxy 234 may apply a private key to the certificate obtained at reference 335 of FIG. 3 to generate a signature for signature field 420.

Timestamp field 430 may include, for example, a timestamp in a network time protocol (NTP) format. For example, TCP proxy 234 may obtain a time value from eGM timing source 240 and insert the time value in NTP timestamp format 432. NTP timestamp format 432 may include, for example, a 32-bit value indicating a number of seconds since an epoch (e.g., a UTC time in seconds since the UNIX epoch of Jan. 1, 1970) and another 32-bit value indicating an applicable fraction of a second for the timestamp. Alternatively, TCP proxy 234 may insert the time value in NTP datestamp format 434. NTP datestamp format 434 may include a 32-bit value era number (e.g., indicating a particular era for an epoch), a 32-bit value indicating the number of seconds since the epoch, and another 32-bit value indicating an applicable fraction of a second for the timestamp.

Air transit time estimate field 440 may include a transit time between UE device 180 and remote unit 205. Values for air transit time estimate field 440 may be obtained by TCP proxy 234 from, for example, vBBU 232.

Figure 4C:
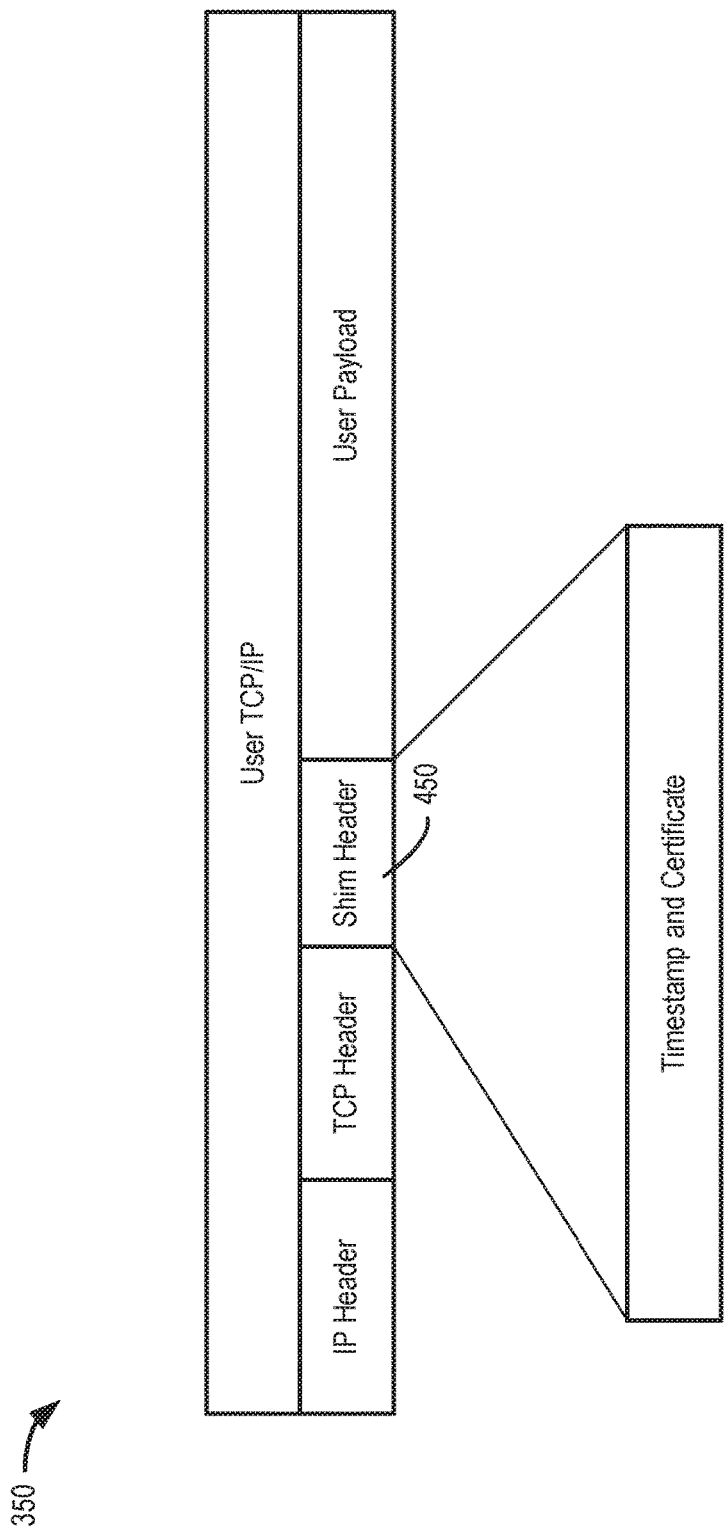
FIG. 4C is a diagram illustrating a timestamped packet using a shim header for the latency certification service, according to another exemplary implementation.

FIG. 4C is a simplified illustration of a timestamped packet 350 for the latency certification service using a shim header, according to another exemplary implementation. As shown in FIG. 4C, timestamped packet 350 may include a shim header 450 inserted between a TCP header and a user payload. According to an implementation, shim header 450 may be configured to include a timestamp and digital certificate similar to that described above in FIG. 4B.

Although FIGS. 4A-4C shows exemplary formats of timestamped packets for the latency certification service, in other implementations, different formats may be used to convey a certified timestamp for the timestamped packets.

Figure 5:
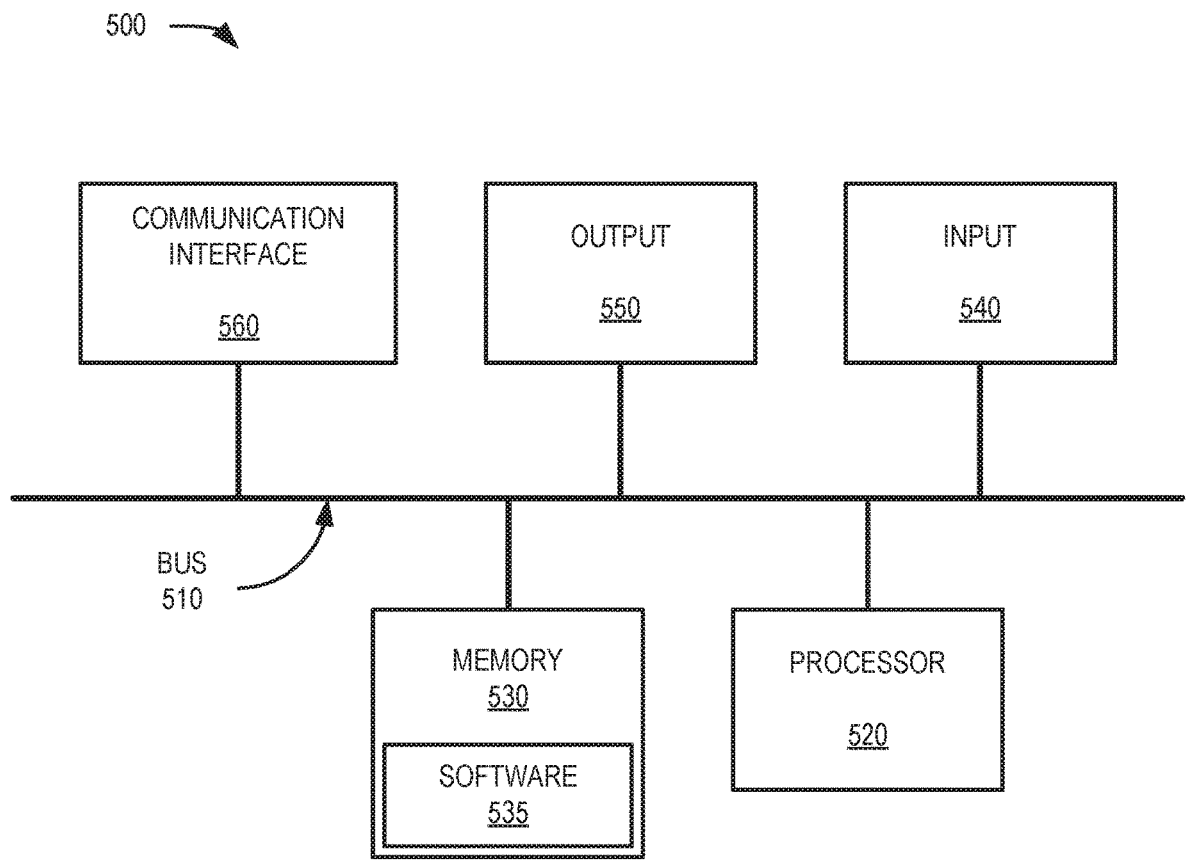
FIG. 5 is a block diagram illustrating exemplary components of a device that may correspond to one of the devices of FIGS. 1 and 2.

FIG. 5 is a block diagram illustrating exemplary components of a device that may correspond to one of the devices of FIGS. 1-3. Each of wireless station 110, MEC device 135, network device 155, network device 165, latency monitoring agent 170, UE device 180, edge node hub 210, application server 250, and certificate authority 260 may be implemented as a combination of hardware and software on one or more of device 500. As shown in FIG. 5, device 500 may include a bus 510, a processor 520, a memory 530, an input component 540, an output component 550, and a communication interface 560.

Bus 510 may include a path that permits communication among the components of device 500. Processor 520 may include a processor, a microprocessor, or processing logic that may interpret and execute instructions. Memory 530 may include any type of dynamic storage device that may store information and instructions, for execution by processor 520, and/or any type of non-volatile storage device that may store information for use by processor 520.

Software 535 includes an application or a program that provides a function and/or a process. Software 535 is also intended to include firmware, middleware, microcode, hardware description language (HDL), and/or other form of instruction. By way of example, when device 500 is a UE device 180, software 535 may include an application that uses the latency certification service.

Input component 540 may include a mechanism that permits a user to input information to device 500, such as a keyboard, a keypad, a button, a switch, touch screen, etc. Output component 550 may include a mechanism that outputs information to the user, such as a display, a speaker, one or more light emitting diodes (LEDs), etc.

Communication interface 560 may include a transceiver that enables device 500 to communicate with other devices and/or systems via wireless communications, wired communications, or a combination of wireless and wired communications. For example, communication interface 560 may include mechanisms for communicating with another device or system via a network. Communication interface 560 may include an antenna assembly for transmission and/or reception of RF signals. For example, communication interface 560 may include one or more antennas to transmit and/or receive RF signals over the air. In one implementation, for example, communication interface 560 may communicate with a network and/or devices connected to a network. Alternatively or additionally, communication interface 560 may be a logical component that includes input and output ports, input and output systems, and/or other input and output components that facilitate the transmission of data to other devices.

Device 500 may perform certain operations in response to processor 520 executing software instructions (e.g., software 535) contained in a computer-readable medium, such as memory 530. A computer-readable medium may be defined as a non-transitory memory device. A non-transitory memory device may include memory space within a single physical memory device or spread across multiple physical memory devices. The software instructions may be read into memory 530 from another computer-readable medium or from another device. The software instructions contained in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

Device 500 may include fewer components, additional components, different components, and/or differently arranged components than those illustrated in FIG. 5. As an example, in some implementations, a display may not be included in device 500. As another example, device 500 may include one or more switch fabrics instead of, or in addition to, bus 510. Additionally, or alternatively, one or more components of device 500 may perform one or more tasks described as being performed by one or more other components of device 500.

Figure 6:
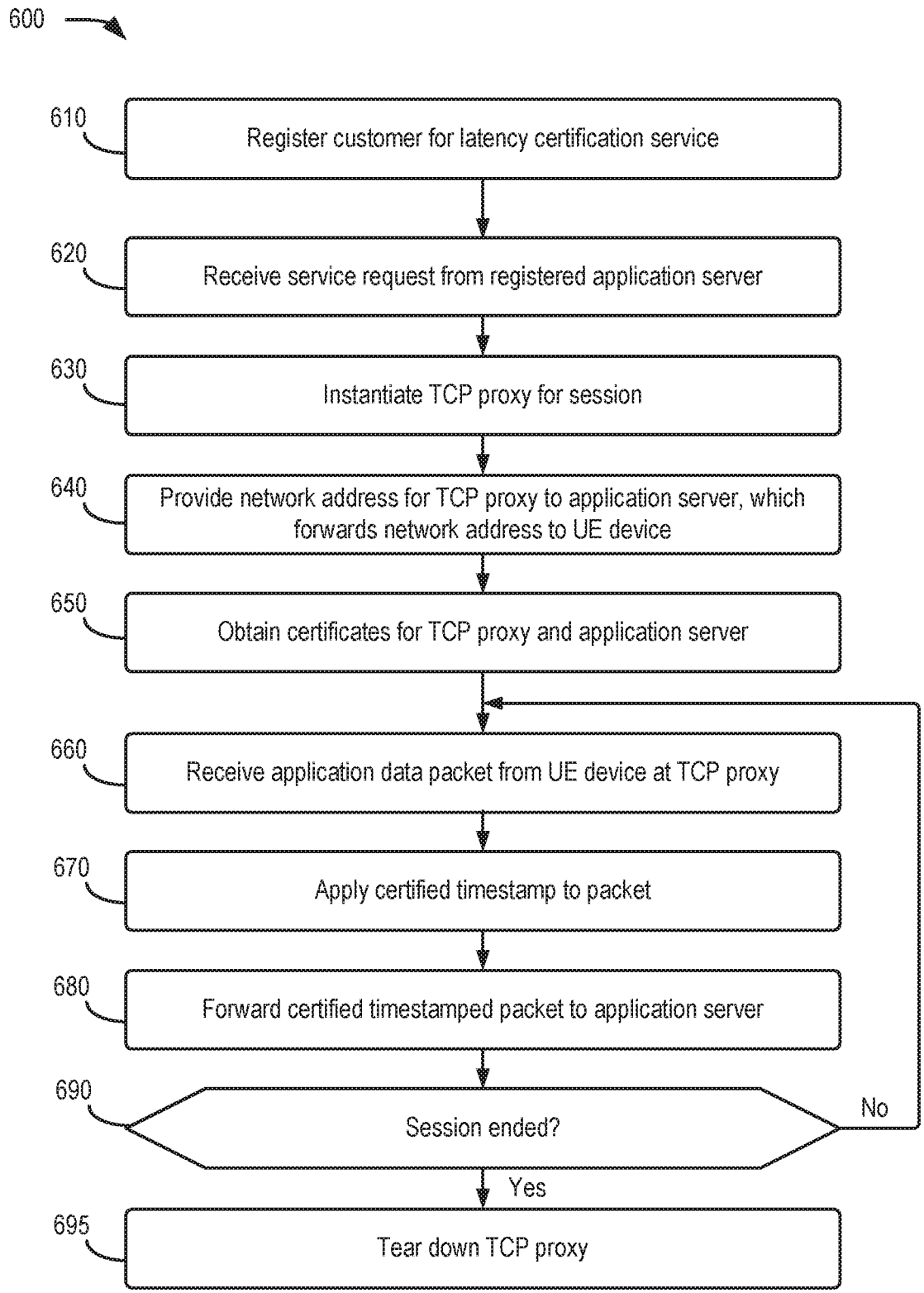
FIG. 6 is a flow diagram illustrating exemplary processes for providing a latency certification service, according to an implementation described herein.

FIG. 6 is a flow diagram illustrating an exemplary process 600 for implementing a latency certification service. In one implementation, process 600 may be performed by latency monitoring agent 170. In another implementation, process 600 may be performed by latency monitoring agent 170 in conjunction with one or more other network devices in network environment 100.

Process 600 may include registering a customer for the latency certification service (block 610). For example, a customer (e.g., developer or network operator for application server 250) may register (e.g., with core network 150) a particular time-sensitive application (e.g., an application accessed on UE devices 180 and supported by application server 250 or another network device 165) for the latency certification service. For each new customer application or version, application developers may have provided input or parameters for policies that impact the configuration of the VCP-FEs 230 and other network resources, such as minimum latency requirements, a minimum number of service instances to support the customer application, required throughput, an amount of reserved/dedicated memory, etc. These customer inputs may influence the types and amounts of computing resources that may be reserved by the latency certification service provider.

Process 600 may further include receiving a service request from a registered application server (block 620), and instantiate a TCP proxy for a session (block 630). For example, as described in connection with FIG. 3, application server 250 may receive a time-sensitive application request from UE device 180 and submit to VCP-FE 230 a request for time-sensitive service. VCP-FE 230 may receive the service request from application server 250, and, in response, VCP-FE 230 may instantiate a TCP proxy 234 to support a data session between UE device 180 and application server 250.

Process 600 may also include providing a network address for the TCP proxy to the application server, which forwards network address to the UE device (block 640) and obtaining a certificate for the TCP proxy and application server (block 650). For example, VCP-FE 230 may provide a network address or other access information for TCP proxy 234 to application server 250. Application server 250 may receive the network address and redirect UE device 180 to send packets to the TCP proxy 234 for the data session. Both application server 250 and TCP proxy 234 may obtain a digital certificate to facilitate delivery of certified timestamps from TCP proxy 234 to application server 250. For example, TCP proxy 234 may obtain the certificate using a TLS exchange with certificate authority 260.

Process 600 may additionally include receiving an application data packet, from a UE device, at the TCP proxy (block 660), applying a certified timestamp to the application data packet (block 670), and forwarding the certified timestamped packet to the application server (block 680). For example, using the network address provided to application server 250 (and subsequently provided to UE device 180), UE device 180 may send an application data packet for the time-sensitive application to TCP proxy 234. TCP proxy 234 may receive the application data packet and apply to the packet a certified timestamp based on timing information from eGM timing source 240. According to an implementation, the certified timestamp may include a signature (e.g., signature field 420), a time indication (e.g., timestamp field 430), and an air transit time estimate (e.g., ATTE field 440). Application server 250 may receive the timestamped packet and may use a private key to decode the signature and validate the certificate for the packet.

Process 600 may also include determining if the data session has ended (block 690). For example, VCP-FE 230 may wait for an indication from application server 250 or UE device 180 that a data session for the time-sensitive application is ended. If the data session has not ended (block 690—No), process 600 may return to process block 660 to receive another application data packet. If the data session has ended (block 690—Yes), process 600 may include tearing down the TCP proxy (block 695). For example, when VCP-FE 230 determined that the data session between application server 250 and UE device 180 has been terminated, VCP-FE 230 may eliminate or deactivate TCP proxy 234 and re-allocate the local virtual machine resources.

Systems and methods described herein provide a latency certification service. One or more network devices in an application service layer network may receive a service request for a latency certification service and, in response, may instantiate a Transmission Control Protocol (TCP) proxy for a data session between an application server device and a user equipment (UE) device. The one or more network devices may obtain a digital certificate for the TCP proxy. The one or more network devices may receive, at the TCP proxy, a data packet from the UE device; may apply a certified timestamp to the data packet to form a certified timestamped data packet; and may forward the certified timestamped data packet to the application server device.

According to an implementation, the certified timestamp is accurate to within less than +/−100 ns due to the presence of a Class-C edge Grand Master timing source (e.g., eGM timing source 240) feeding the VCP-FE platform (e.g., VCP-FE 230). Since the RAN to UE signals are controlled by the vBBU on the VCP-FE and since the VCP-FE is housed on network provider premises (e.g., edge node hub 210 or MEC network 130), the certified timestamp cannot be spoofed. The latency certification service may be subscribed to, for example, by organizations (e.g., using application servers 250) wishing to offer fair or equalized access/transaction times to their user base or consistent latency for certain types of users.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 520, etc.), or a combination of hardware and software (e.g., software 535).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 520) of a device. A non-transitory storage medium includes one or more of the storage mediums described in relation to memory 530.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
   receiving, by one or more network devices of an application service layer network, a service request from an application server device for a latency certification service;
   instantiating, by the one or more network devices and in response to the service request, a Transmission Control Protocol (TCP) proxy for a data session between the application server device and a user equipment (UE) device;
   obtaining, by the TCP proxy, a digital certificate from a certificate authority;
   receiving, by the TCP proxy and from the UE device, a data packet for the application server device;
   obtaining, by the TCP proxy, a timestamp from a master timing source at an edge of the application service layer network;
   applying, by the TCP proxy, the timestamp and a signature to the data packet to form a certified timestamped data packet wherein the signature is based on the digital certificate; and
   forwarding, by the TCP proxy, the certified timestamped data packet to the application server device.

2. The method of claim 1, wherein applying the certified timestamp includes:
   inserting the certified timestamp within an options field of a TCP header for the data packet.

3. The method of claim 1, wherein applying the certified timestamp includes one or more of:
   inserting the certified timestamp within a shim header for the data packet; or
   wrapping the data packet in another header that includes the certified timestamp.

4. The method of claim 1, wherein the timestamp marks a receipt time of the data packet at the edge of the application service layer network.

5. The method of claim 4, wherein the master timing source is accurate within about 100 nanoseconds.

6. The method of claim 1, wherein the TCP proxy includes an instance of a virtual machine executing on the one or more network devices.

7. The method of claim 1, wherein applying the certified timestamp further includes:
   determining, by the one or more network devices, an estimated air transit time between the UE device and the one or more network devices, and
   adding the estimated air transit time to the certified timestamp.

8. The method of claim 1, further comprising:
   after instantiating, providing, to the application server device, a network address for the TCP proxy.

9. The method of claim 1, further comprising:
   determining, by the one or more network devices, that the data session between the application server device and the UE device has ended; and
   tearing down the TCP proxy based on the determining.

10. The method of claim 1, wherein the one or more network devices are included within one of:
    an edge hub for a radio access network; or
    a multi-access edge computing (MEC) network.

11. A network device in an application service layer network, the network device comprising:
    a communications interface;
    a memory to store instructions; and
    one or more processors, wherein the one or more processors execute the instructions to:
      receive, from an application server device, a service request for a latency certification service;
      instantiate, in response to the service request, a Transmission Control Protocol (TCP) proxy for a data session between the application server device and a user equipment (UE) device;
      obtain a digital certificate for the TCP proxy from a certificate authority;
      receive, at the TCP proxy and from the UE device, a data packet for the application server device;
      obtain, by the TCP proxy, a timestamp from a master timing source at an edge of the application service layer network;
      apply, by the TCP proxy, the timestamp and a signature to the data packet to form a certified timestamped data packet wherein the signature is based on the digital certificate; and
      forward, by the TCP proxy, the certified timestamped data packet to the application server device.

12. The network device of claim 11, wherein, when applying the certified timestamp, the one or more processors further execute the instructions to:
    insert the certified timestamp within an options field of a TCP header for the data packet.

13. The network device of claim 11, wherein the timestamp marks a receipt time of the data packet at the edge of the application service layer network.

14. The network device of claim 11, wherein when applying the certified timestamp, the one or more processors further execute the instructions to:
    insert the certified timestamp within a shim header for the data packet.

15. The network device of claim 11, wherein the one or more processors include an instance of a virtual machine providing the TCP proxy for the data session between the application server device and the UE device.

16. The network device of claim 11, wherein the one or more processors further execute the instructions to:
    determine an estimated air transit time between the UE device and the one or more network devices, wherein the estimated air transit time is included with the certified timestamp.

17. The network device of claim 11, wherein the one or more processors further execute the instructions to:

send, to the application server device after the instantiating, a network address for the TCP proxy.

18. A non-transitory computer-readable storage medium storing instructions executable by a processor of a device, which when executed cause the device to:
- receive, from an application server device, a service request for a latency certification service;
- instantiate, in response to the service request, a Transmission Control Protocol (TCP) proxy for a data session between the application server device and a user equipment (UE) device;
- obtain a digital certificate for the TCP proxy from a certificate authority;
- receive, at the TCP proxy and from the UE device, a data packet for the application server device;
- obtain, by the TCP proxy, a timestamp from a master timing source at an edge of the application service layer network;
- apply, by the TCP proxy, the timestamp and a signature to the data packet to form a certified timestamped data packet wherein the signature is based on the digital certificate; and
- forward, by the TCP proxy, the certified timestamped data packet to the application server device.

19. The non-transitory computer-readable storage medium of claim 18, wherein the instructions to apply the certified timestamp further include instructions to:
- insert the certified timestamp within an options field of a TCP header for the data packet;
- insert the certified timestamp within a shim header for the data packet; or
- wrap the data packet in another header that includes the certified timestamp.

20. The non-transitory computer-readable storage medium of claim 18, further comprising instructions to:
- provide, to the application server device, a network address for the TCP proxy;
- determine that the data session between the application server device and the UE device has ended; and
- tear down the TCP proxy based on determining that the data session between the application server device and the UE device has ended.

* * * * *